F. M. NEAL.
PNEUMATIC TIRE PLUGGING THIMBLE.
APPLICATION FILED SEPT. 23, 1907.
No. 907,273.
Patented Dec. 22, 1908.
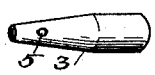
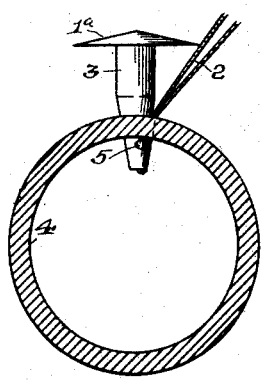
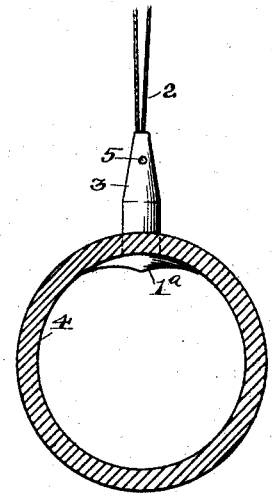
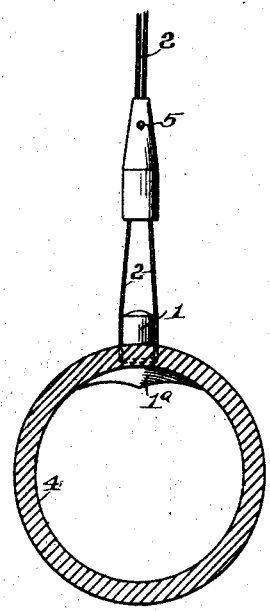
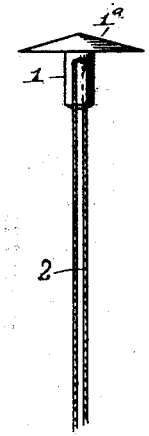
Witnesses:
H. A. Lamb
H. R. Frisbie
Inventor
Frederick M. Neal
By his Attorney Geo. O. Phillips

UNITED STATES PATENT OFFICE.

FREDERICK M. NEAL, OF BRIDGEPORT, CONNECTICUT.

PNEUMATIC-TIRE-PLUGGING THIMBLE.

No. 907,273.     Specification of Letters Patent.     Patented Dec. 22, 1908.

Application filed September 23, 1907. Serial No. 394,012.

*To all whom it may concern:*

Be it known that I, FREDERICK M. NEAL, a citizen of the United States, and a resident of Bridgeport, in the county of Fairfield and State of Connecticut, have invented certain new and useful Improvements in Pneumatic-Tire-Plugging Thimbles, of which the following is a specification.

My invention relates to a device adapted for use in plugging pneumatic tires, consisting of a metal thimble, or other hard material, adapted to be temporarily placed on the stem of a rubber plug to serve as a guide for the entering of the stem in the puncture of a pneumatic tire.

To enable others to understand my invention reference is had to the accompanying drawings in which:

Figure 1 represents a detail view in perspective of the inserting thimble; Fig. 2 is a transverse sectional view of a tire showing the manner of applying the thimble; Fig. 3 is a transverse sectional view of a tire showing the plug properly seated in the tire with the taper end of the thimble protruding without the tire; Fig. 4 is a transverse sectional view of a tire with the plug seated and the thimble withdrawn therefrom, and Fig. 5 is a detail view of the rubber plug.

The rubber plug shown at Fig. 5 is of the ordinary construction used for plugging holes in pneumatic tires consisting of the solid body or stem 1 having the mushroom-like head 1$^a$.

2 is the pulling string secured to the stem for the purpose of reëntering and seating the head of the plug on the interior of the tire. This is the usual device now employed to plug holes in tires, but it is very difficult to insert the stem of the plug in a hole smaller than such body, as the resistance offered would cause said body to spread or expand.

To facilitate the insertion of the shank of the rubber plug, I employ the shell thimble 3 tapered for a portion of its length and small enough at its forward end to insure its being inserted in the smallest aperture.

To operate the device, the branches of the cord 2 are passed through the thimble from its rear or straight end and such straight portion is seated on the stem 1 of the rubber plug. The cord is then pulled back against the outer surface of the thimble and the taper end of the thimble inserted in the hole of the tire 4 as shown at Fig. 2. The exterior of the thimble being smooth and frictionless can readily be forced in and expand the hole to freely admit the larger or straight portion of the thimble.

When the inner surface of the head 1$^a$ is brought against the outer surface of the tire, said head is then pushed through the hole in the usual manner, the thin flexible edges of the head readily folding up to facilitate the operation. When the plug and thimble are within the tire, the ends of the cord will be on the outside so that an outward pull on the cord will cause the thimble to reënter the hole from the inside of the tire and bring the head 1$^a$ of the plug against the inner wall, as shown at Fig. 3, where it will be held by the air-pressure when the tire is inflated. After the plug is thus properly seated, the thimble is withdrawn as shown at Fig. 4, and the outer projecting end of the stem of the plug is then cut off close to the tire. The hole 5 is formed transversely through the thimble to be used in case the cord 2 should break before the head of the plug is properly seated, in which case another cord can be passed through the hole 5 to complete the seating of the plug. This hole is also useful in withdrawing the thimble by inserting the end of a wire therein, especially where the hole in the tire is so small that the pressure or grip of the side of said hole would make it difficult to extract the thimble with the fingers.

While I show the hole 5 in the thimble as, perhaps, the simplest means whereby said thimble can be withdrawn from the tire by the insertion therein of another cord or wire in case the pulling cord breaks, I hold myself at liberty to employ any suitable means that would be the equivalent of said hole.

Having thus described my invention, what I claim as new and desire to secure by Letters Patent is:—

1. The combination with a rubber plug adapted to close the puncture in a pneumatic tire, of a hollow tapered thimble adapted to be temporarily placed on the plug to form an entering guide therefor, means provided on said thimble for the purpose of seating the plug or withdrawing the thimble after the plug is seated, for the purpose set forth.

2. The combination with a rubber plug adapted to close a puncture in a pneumatic tire and having a flexible head and a stem projecting therefrom and a pulling cord attached to said stem, of a hollow thimble tapered at one end, the opposite end adapted to be temporarily seated on the stem, said thimble and plug adapted to be forced from the outside through the puncture of the tire to the interior of said tire and reversed by means of the cord so as to reënter the thimble in said puncture from the inside of the tire, said thimble having means provided thereon whereby it can be withdrawn from the tire should the pulling cord break during the operation of seating the plug, for the purpose set forth.

Signed at Bridgeport in the county of Fairfield and State of Connecticut this 30th day of August, A. D. 1907.

FREDERICK M. NEAL.

Witnesses:
GEORGE W. FINN,
HENRY R. FRISBIE.